(12) United States Patent
Zhou et al.

(10) Patent No.: US 11,426,767 B2
(45) Date of Patent: Aug. 30, 2022

(54) SHAKER SCREENS FOR SHALE SHAKERS

(71) Applicant: Hebei GN Solids Control Co., Ltd., Hebei (CN)

(72) Inventors: Pengxian Zhou, Hebei (CN); Chunlin Zhao, Hebei (CN); Kun Qi, Hebei (CN); Yanlong Yang, Hebei (CN)

(73) Assignee: Hebei GN Solids Control Co., Ltd., Hebei (CN)

( * ) Notice: Subject to any disclaimer, the term of this patent is extended or adjusted under 35 U.S.C. 154(b) by 169 days.

(21) Appl. No.: 16/977,453

(22) PCT Filed: Jul. 15, 2020

(86) PCT No.: PCT/CN2020/102192
§ 371 (c)(1),
(2) Date: Sep. 1, 2020

(87) PCT Pub. No.: WO2022/006945
PCT Pub. Date: Jan. 13, 2022

(65) Prior Publication Data
US 2022/0168778 A1 Jun. 2, 2022

(30) Foreign Application Priority Data
Jul. 6, 2020 (CN) .......................... 202010642885.0

(51) Int. Cl.
*B07B 1/46* (2006.01)
(52) U.S. Cl.
CPC .......... *B07B 1/4645* (2013.01); *B07B 1/4663* (2013.01); *B07B 1/4672* (2013.01)

(58) Field of Classification Search
CPC ... B07B 1/4645; B07B 1/4663; B07B 1/4672; B07B 1/46
USPC ................................................. 209/363, 405
See application file for complete search history.

(56) References Cited

U.S. PATENT DOCUMENTS

| | | | |
|---|---|---|---|
| 3,045,824 A | 7/1962 | Parks | |
| 4,222,865 A | 9/1980 | Valeri et al. | |
| 5,392,925 A | 2/1995 | Seyffert | |
| 5,811,003 A | 9/1998 | Young et al. | |
| 5,851,393 A | 12/1998 | Carr et al. | |
| 5,950,841 A | 9/1999 | Knox et al. | |

(Continued)

FOREIGN PATENT DOCUMENTS

| | | |
|---|---|---|
| CN | 2149981 Y | 12/1993 |
| EP | 0 782 887 A2 | 7/1997 |
| WO | 83/02075 | 6/1983 |

*Primary Examiner* — Michael McCullough
*Assistant Examiner* — Muhammad Awais
(74) *Attorney, Agent, or Firm* — Morgan, Lewis & Bockius LLP

(57) ABSTRACT

This disclosure discloses a shaker screen. The shaker screen comprises a frame and at least one screen layer supported by the frame for sieving materials. The frame comprises a rectangular outer support structure, at least one lateral inner support member, and at least one longitudinal inner support member. The lateral inner support member comprises an aperture, and the longitudinal inner support member comprises a groove on a side of the longitudinal inner support member. The lateral inner support member is engaged with the longitudinal inner support member by engaging the aperture on the lateral inner support member and the groove on the longitudinal inner support member.

17 Claims, 12 Drawing Sheets

(56) References Cited

U.S. PATENT DOCUMENTS

| | | | |
|---|---|---|---|
| 6,070,737 A | 6/2000 | Russell et al. | |
| 6,305,549 B1 | 10/2001 | Riddle et al. | |
| 6,439,392 B1 | 8/2002 | Balzer | |
| 6,675,975 B1 | 1/2004 | Cook et al. | |
| 7,210,582 B2 | 5/2007 | Riddle | |
| 7,810,649 B2 * | 10/2010 | Robertson | B07B 1/4672 209/403 |
| 7,819,254 B2 * | 10/2010 | Robertson | B07B 1/46 209/397 |
| 7,992,719 B2 | 8/2011 | Carr et al. | |
| 8,596,464 B2 * | 12/2013 | Robertson | B07B 1/46 209/403 |
| 8,925,735 B2 | 1/2015 | Robertson et al. | |
| 9,079,222 B2 | 7/2015 | Burnett et al. | |
| 2004/0245154 A1 | 12/2004 | Baltzer et al. | |
| 2007/0125687 A1 | 6/2007 | Kutryk | |
| 2008/0257791 A1 * | 10/2008 | Malmberg | B07B 1/46 209/412 |
| 2011/0220556 A1 * | 9/2011 | Malmberg | B07B 1/4645 209/412 |
| 2015/0021241 A1 * | 1/2015 | Ralph | B07B 1/4618 209/408 |
| 2018/0243797 A1 * | 8/2018 | Wojciechowski | B07B 1/4645 |

* cited by examiner

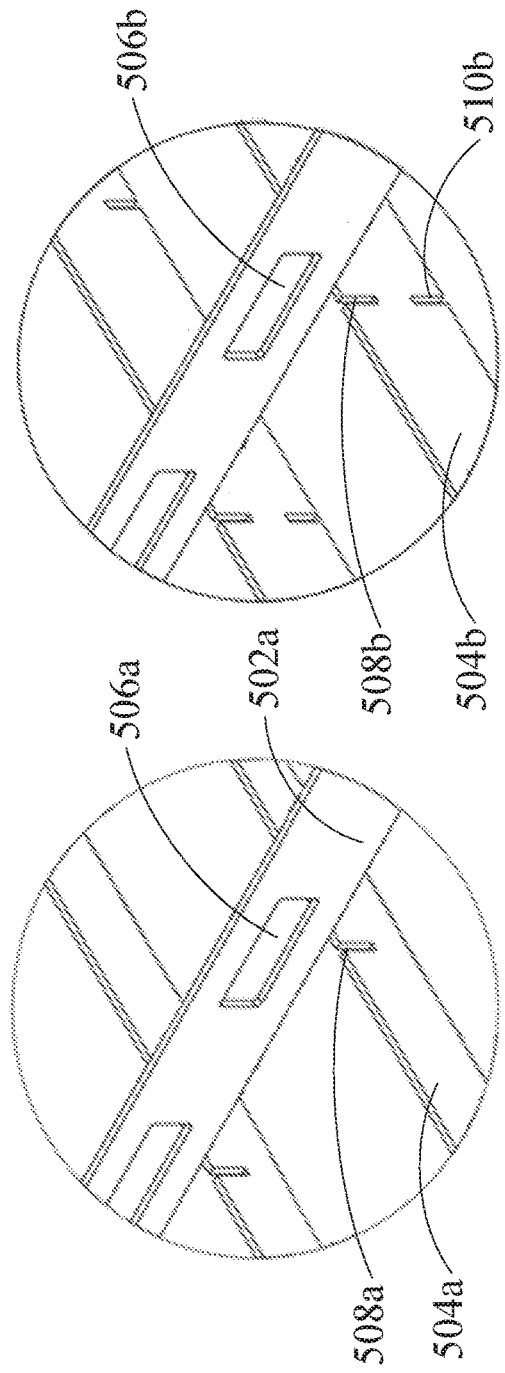
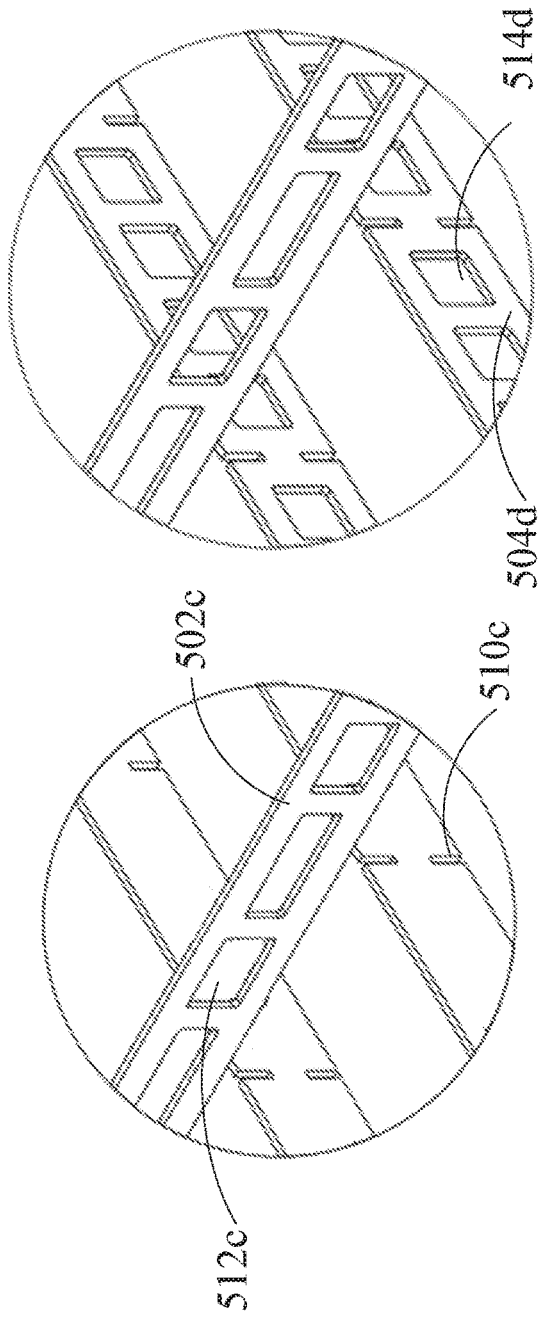

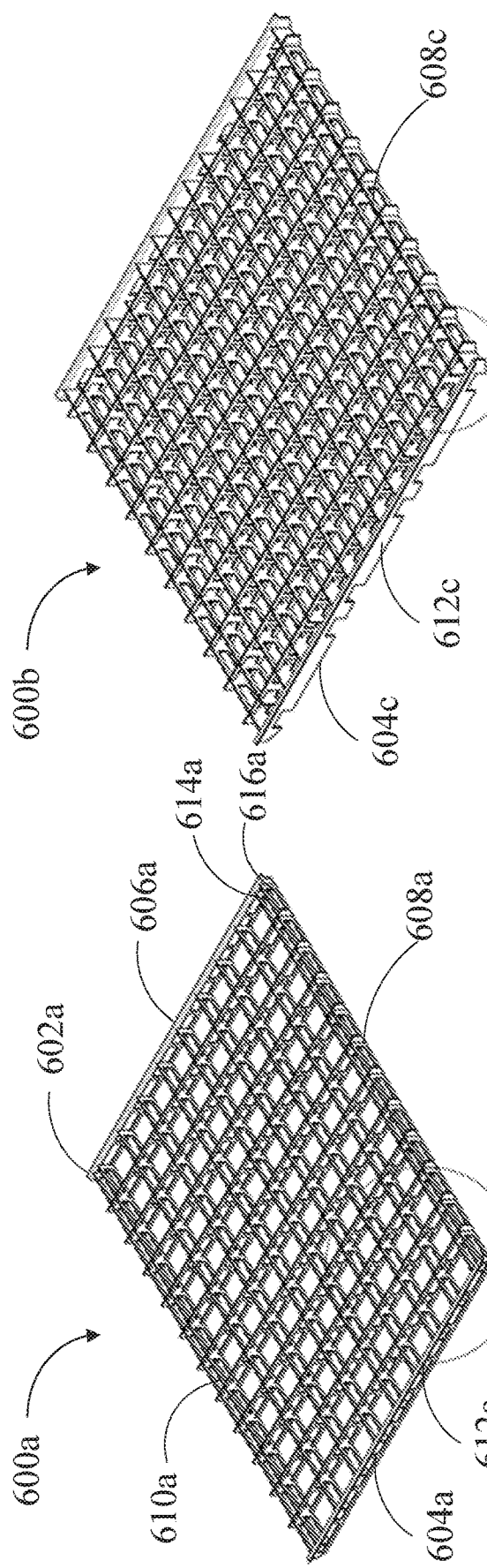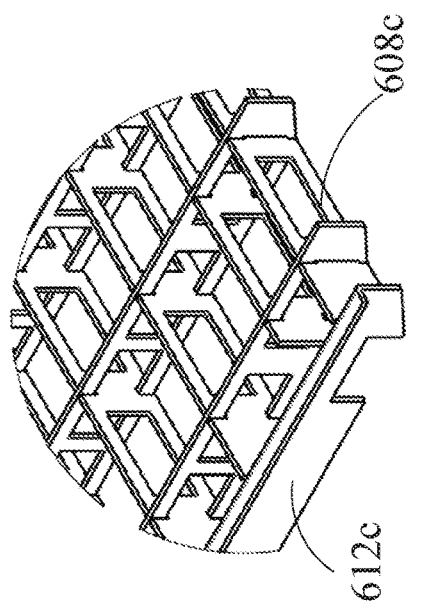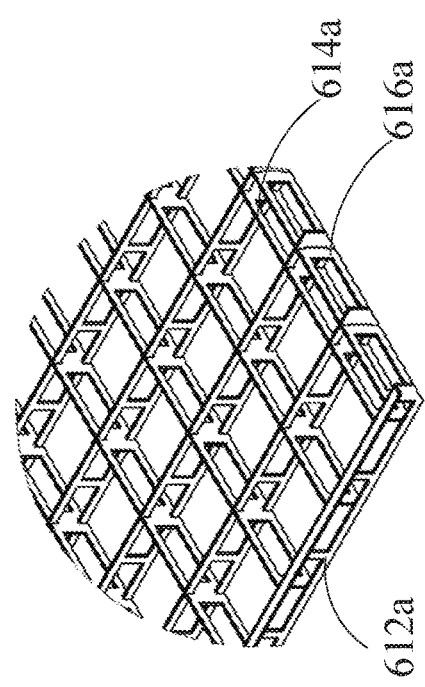

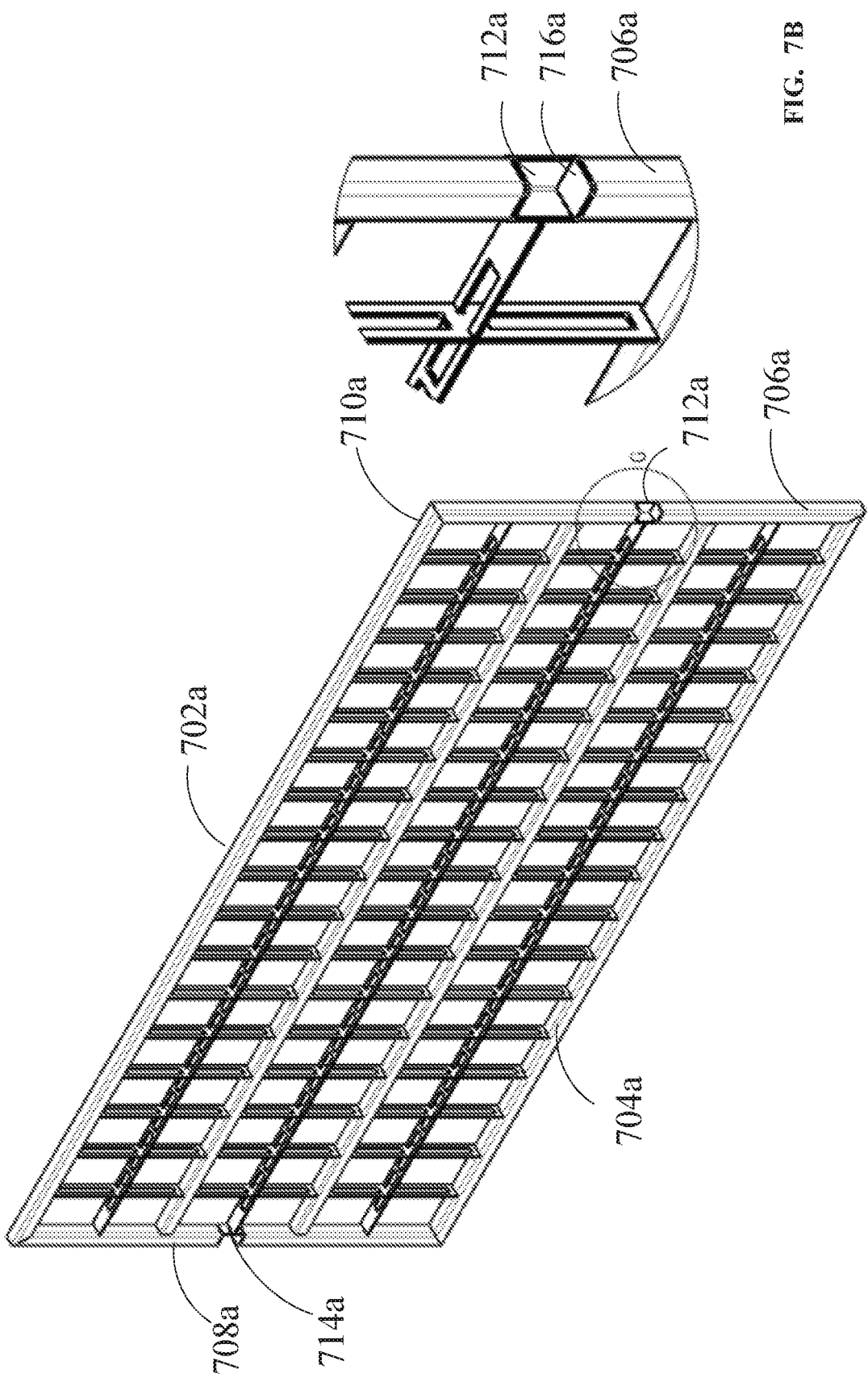

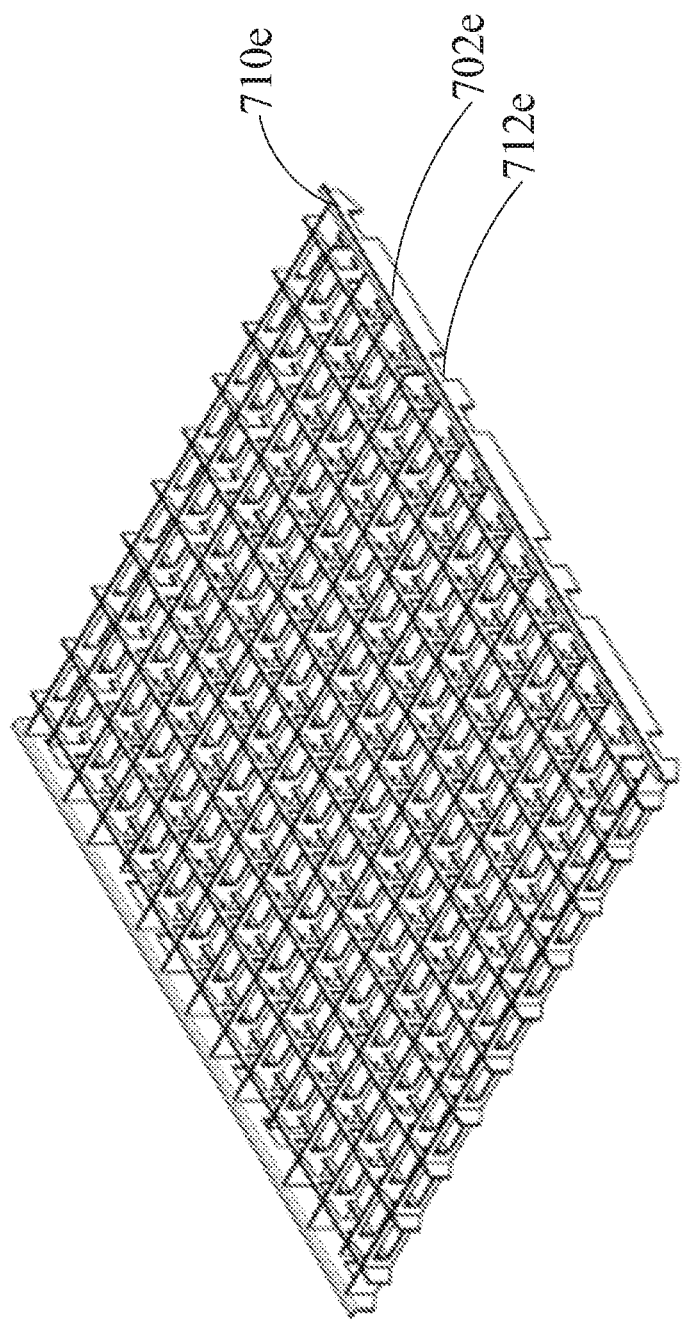
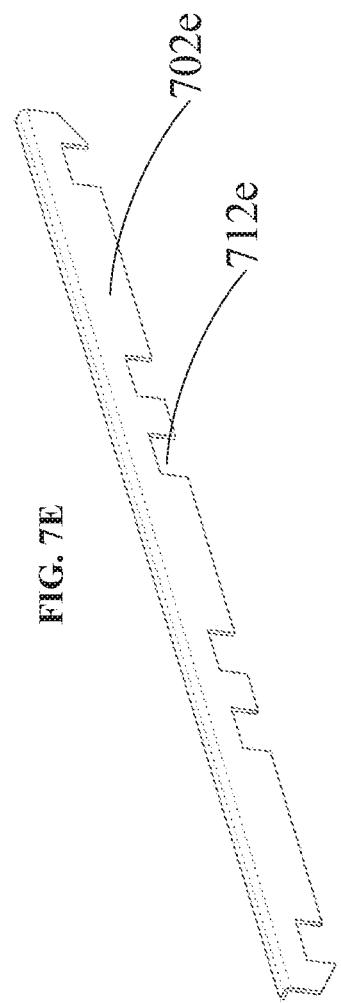
FIG. 7E
FIG. 7F

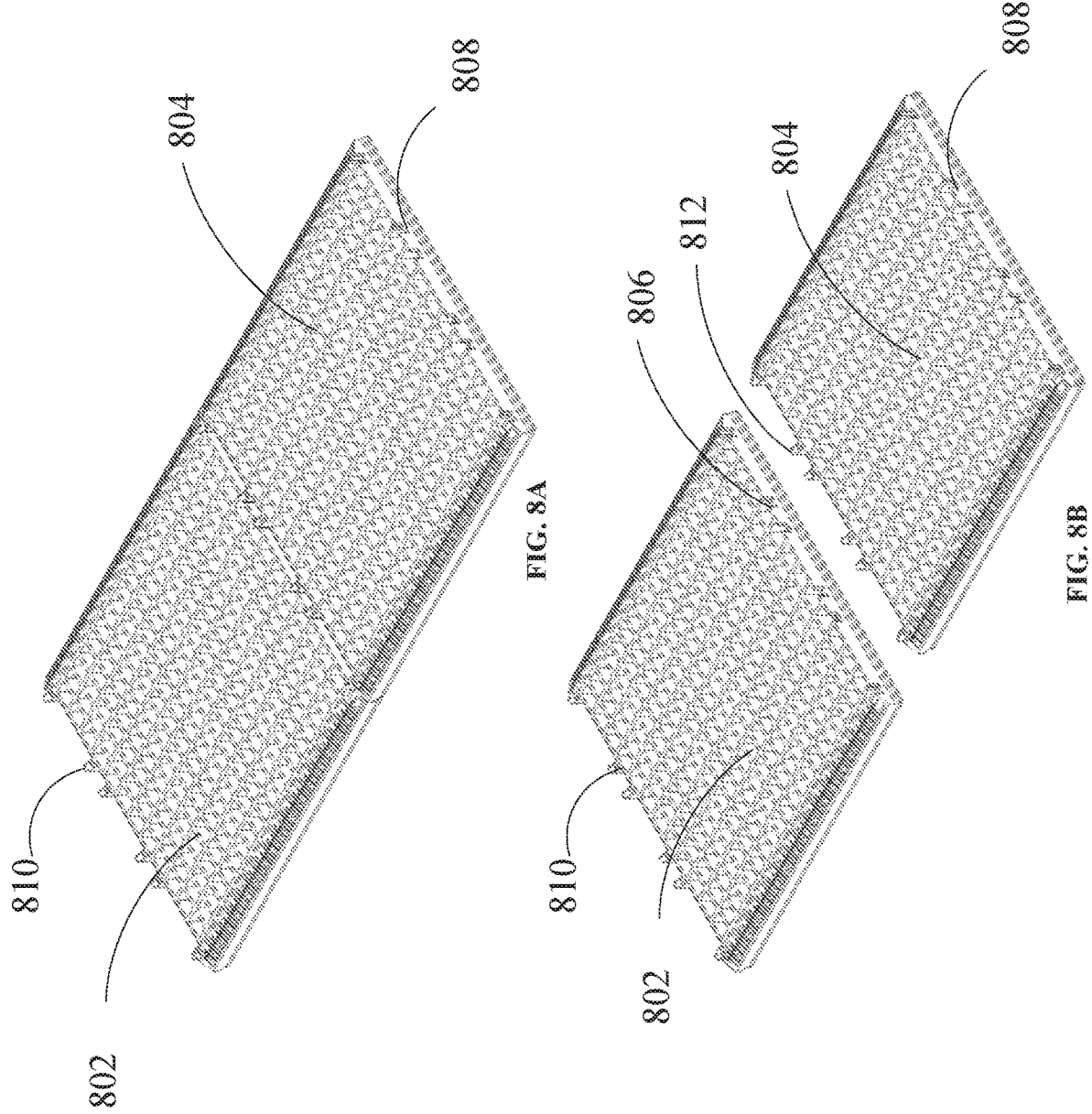

SHAKER SCREENS FOR SHALE SHAKERS

CLAIM FOR PRIORITY

This application is a U.S. national phase entry under 35 U.S.C. § 371 from PCT International Application No. PCT/CN2020/102192 filed on Jul. 15, 2020, which is based upon and claims the benefit of priority from prior Chinese Patent Application No. 202010642885.0 filed on Jul. 6, 2020. The above applications are incorporated herein by reference in their entirety.

TECHNICAL FIELD

The present disclosure relates generally to shaker screens for shale shakers, and more particularly to shaker screens having a frame with reinforced rigidity and reduced weight.

BACKGROUND

Shale shakers may be used to remove bulk solids from drilling mud slurry. Shaker screens may be removably secured to a shale shaker to separate solids and liquids in the drilling mud slurry. A shaker screen may include a frame to support the screen layers fitted over it. A frame formed with materials with less rigidity may not be able to bear the weight of the dense slurry during vibration of the shale shaker, which may reduce the lifetime of the shaker screen. A frame formed with rigid materials, e.g., metals, may be used to reinforce the shaker screen and provide sufficient rigidity to avoid bending under the weight of the dense slurry. However, using a metal frame may result in a heavy shaker screen, which may cause difficulty of securing the shaker screen to the shale shaker since the shaker screen is usually man-handled into position. In addition, a wedge block clamp may be used to secure the shaker screen to the shale shaker. However, the looseness of the wedge block clamp during the vibration may cause undesired moving of the shaker screen, which may reduce the efficiency of filtering out solids from drilling mud slurry.

Thus, to develop apparatus, systems, and methods that take into account at least some of the issues discussed above, as well as other possible issues is a general industrial demand.

SUMMARY

Exemplary embodiments of the present disclosure are directed to shaker screens having a frame with reinforced rigidity and reduced weight. In exemplary embodiments, the frame comprises a rectangular outer support structure, at least one lateral inner support member, and at least one longitudinal inner support member. The lateral inner support member comprises an aperture, and the longitudinal inner support member comprises a groove on a side of the longitudinal inner support member. The lateral inner support member is engaged with the longitudinal inner support member by engaging the aperture and the groove. In this way, the frame can provide reinforced rigidity and reduced weight for the shaker screen. In some embodiments, the frame may also provide additional apertures on the lateral inner support member and/or the longitudinal inner support member to further reduce the weight of the frame. In some embodiments, the frame may also comprise exposed notches or other means on the rectangular outer support structure to connect the shaker screen to a device such as a shale shaker or another shaker screen.

Exemplary embodiments of the present disclosure can provide multiple advantages over existing solutions. One advantage is that exemplary embodiments of the present disclosure can reinforce the structure and increase the rigidity of the frame. In exemplary embodiments, engaging the lateral inner support member and the longitudinal inner support member can not only preserve the tension in the screen layers of the shaker screen but also avoid bending under the weight of the dense slurry. Another advantage is that exemplary embodiments of the present disclosure can reduce the weight of the shaker screen, by introducing one or more apertures to the lateral inner support member and/or the longitudinal inner support member. In addition, in some exemplary embodiments, exposed notches on the rectangular outer support structure can connect to another shaker screen to enlarge the area of the screen layers and increase the throughput of a shale shaker. In some exemplary embodiments, exposed notches may also connect to a shale shaker by coupling with a bump on the shale shaker, to fix the shaker screen and reduce the undesirable relative movement between the shaker screen and the shale shaker when the shale shaker vibrates.

The present disclosure includes, without limitations, the following exemplary embodiments.

Some exemplary embodiments provide a frame for a shaker screen, comprising: a rectangular outer support structure, comprising two lateral outer support members and two longitudinal outer support members; at least one lateral inner support member, comprising a first aperture and coupled to the two longitudinal outer support members; and at least one longitudinal inner support member, comprising a first groove on a first side of the at least one longitudinal inner support member and coupled to the two lateral outer support members. The first aperture is engaged with the first groove, such that the at least one lateral inner support member is engaged with the at least one longitudinal inner support member.

In some exemplary embodiments or any combination of preceding exemplary embodiments of the frame, the at least one longitudinal inner support member further comprises a second groove on a second side of the at least one longitudinal inner support member, and the second side is parallel to the first side, and wherein the first aperture is engaged with the first groove and the second groove.

In some exemplary embodiments or any combination of preceding exemplary embodiments of the frame, the at least one lateral inner support member comprises one or more second apertures, or the at least one longitudinal inner support member comprises one or more third apertures, configured to reduce a weight of the at least one lateral inner support member or the at least one longitudinal inner support member.

In some exemplary embodiments or any combination of preceding exemplary embodiments of the frame, the first aperture is engaged with the first groove, with the first aperture being interlocked to the first groove.

In some exemplary embodiments or any combination of preceding exemplary embodiments of the frame, at least one of the two lateral outer support members or the two longitudinal outer support members comprises one or more slats.

In some exemplary embodiments or any combination of preceding exemplary embodiments of the frame, at least one of the one or more slats comprises a bent slat configured to enhance strength of the rectangular outer support structure.

In some exemplary embodiments or any combination of preceding exemplary embodiments of the frame, at least one of the two lateral outer support members or the two longitudinal outer support members comprises an exposed notch configured to connect to a device or another shaker screen.

In some exemplary embodiments or any combination of preceding exemplary embodiments of the frame, the rectangular outer support structure comprises means for securing the shaker screen on a device or another shaker screen.

Some exemplary embodiments provide a shaker screen, comprising: a frame for the shaker screen, and at least one screen layer supported by the frame for sieving materials. The frame of shaker screen comprises: a rectangular outer support structure, comprising two lateral outer support members and two longitudinal outer support members; at least one lateral inner support member, comprising a first aperture and coupled to the two longitudinal outer support members; and at least one longitudinal inner support member, comprising a first groove on a first side of the at least one longitudinal inner support member and coupled to the two lateral outer support members. The first aperture is engaged with the first groove, such that the at least one lateral inner support member is engaged with the at least one longitudinal inner support member.

In some exemplary embodiments or any combination of preceding exemplary embodiments of the frame, the rectangular outer support structure comprises means for securing the shaker screen on a device or another shaker screen.

Some exemplary embodiments provide a method of forming a frame for a shaker screen, comprising providing a rectangular outer support structure comprising two lateral outer support members and two longitudinal outer support members; providing at least one lateral inner support member comprising a first aperture; providing at least one longitudinal inner support member comprising a first groove on a first side of the at least one longitudinal inner support member; engaging the at least one lateral inner support member with the at least one longitudinal inner support member by interlocking the first aperture with the first groove; and connecting the at least one lateral inner support member and the at least one longitudinal inner support member to the rectangular outer support structure to form a frame for the shaker screen.

Some exemplary embodiments provide a system, comprising: a shale shaker, and a shaker screen removably mounted on the shale shaker. The shaker screen comprises a frame for the shaker screen, and at least one screen layer supported by the frame for sieving materials. The frame of shaker screen comprises: a rectangular outer support structure, comprising two lateral outer support members and two longitudinal outer support members; at least one lateral inner support member, comprising a first aperture and coupled to the two longitudinal outer support members; and at least one longitudinal inner support member, comprising a first groove on a first side of the at least one longitudinal inner support member and coupled to the two lateral outer support members. The first aperture is engaged with the first groove, such that the at least one lateral inner support member is engaged with the at least one longitudinal inner support member.

In some exemplary embodiments or any combination of preceding exemplary embodiments of the frame, at least one of the two lateral outer support members or the two longitudinal outer support members comprises an exposed notch configured to connect to the shale shaker or another shaker screen.

These and other features, aspects, and advantages of the present disclosure will be apparent from a reading of the following detailed description together with the accompanying figures, which are briefly described below. The present disclosure includes any combination of two or more features or elements set forth in this disclosure, regardless of whether such features or elements are expressly combined or otherwise recited in a specific example embodiment described herein. This disclosure is intended to be read holistically such that any separable features or elements of the disclosure, in any of its aspects and exemplary embodiments, should be viewed as combinable unless the context of the disclosure clearly dictates otherwise.

It will therefore be appreciated that this brief summary is provided merely for purposes of summarizing some exemplary embodiments so as to provide a basic understanding of some aspects of the disclosure. Accordingly, it will be appreciated that the above described exemplary embodiments are merely examples and should not be construed to narrow the scope or spirit of the disclosure in any way. Other example embodiments, aspects and advantages will become apparent from the following detailed description taken in conjunction with the accompanying figures which illustrate, by way of example, the principles of some described exemplary embodiments.

BRIEF DESCRIPTION OF THE DRAWINGS

Figure 1A:
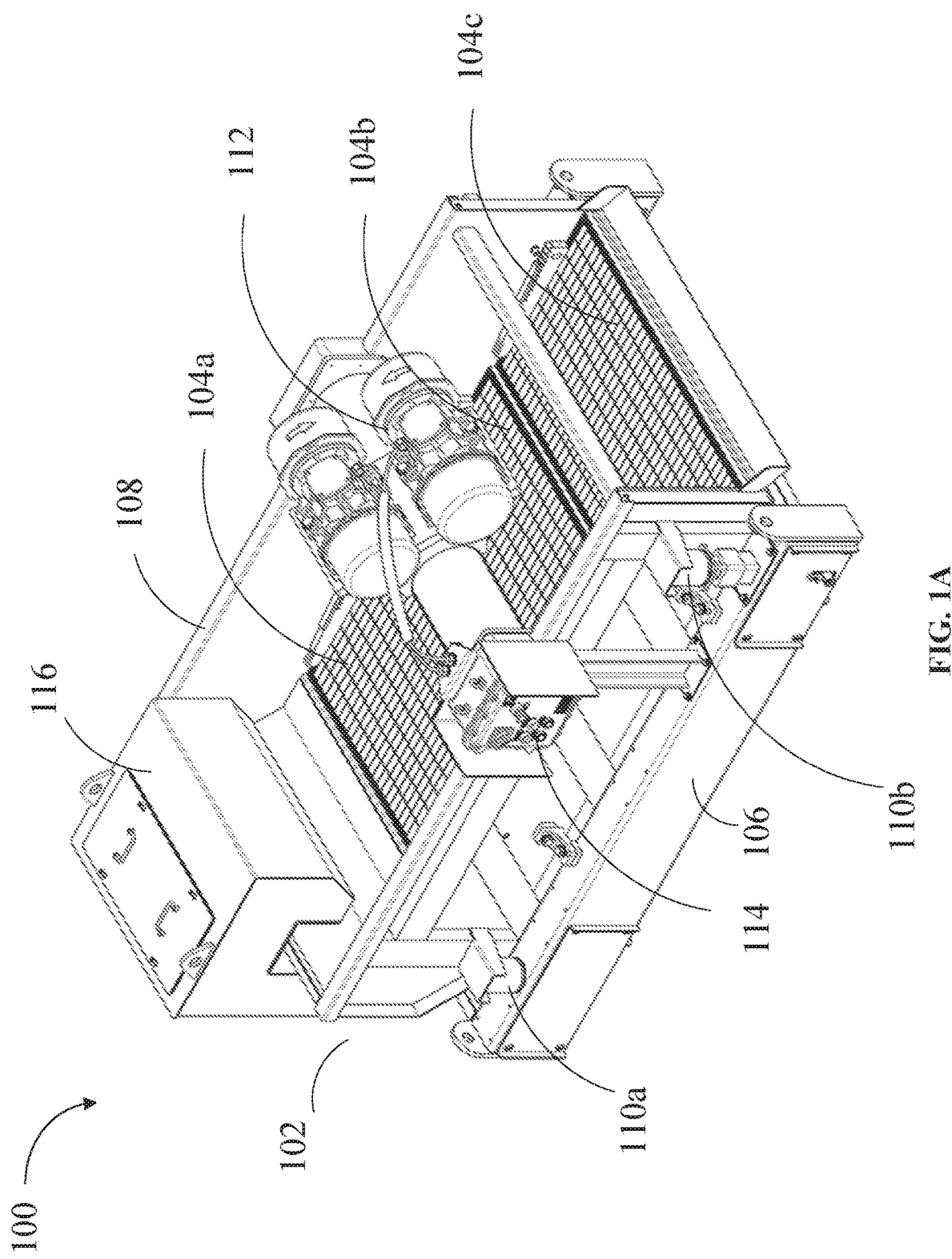
Figure 1C:
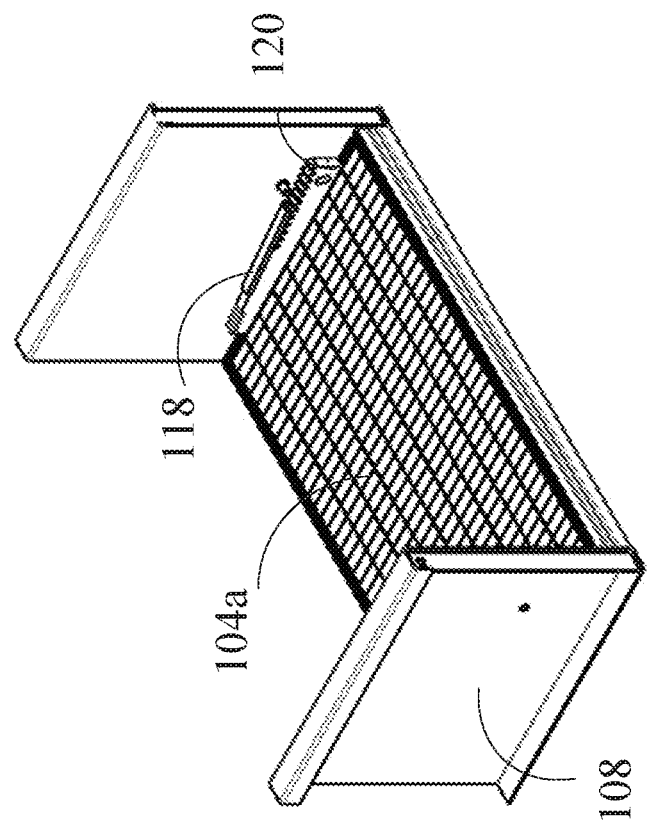
Figure 1B:
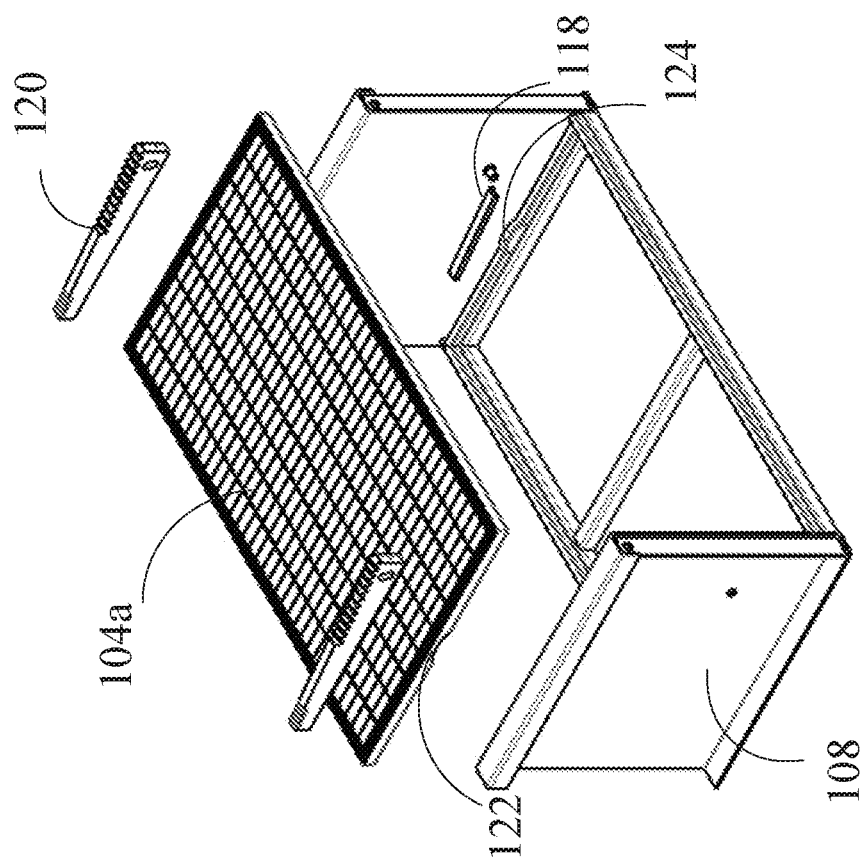
Figure 2:
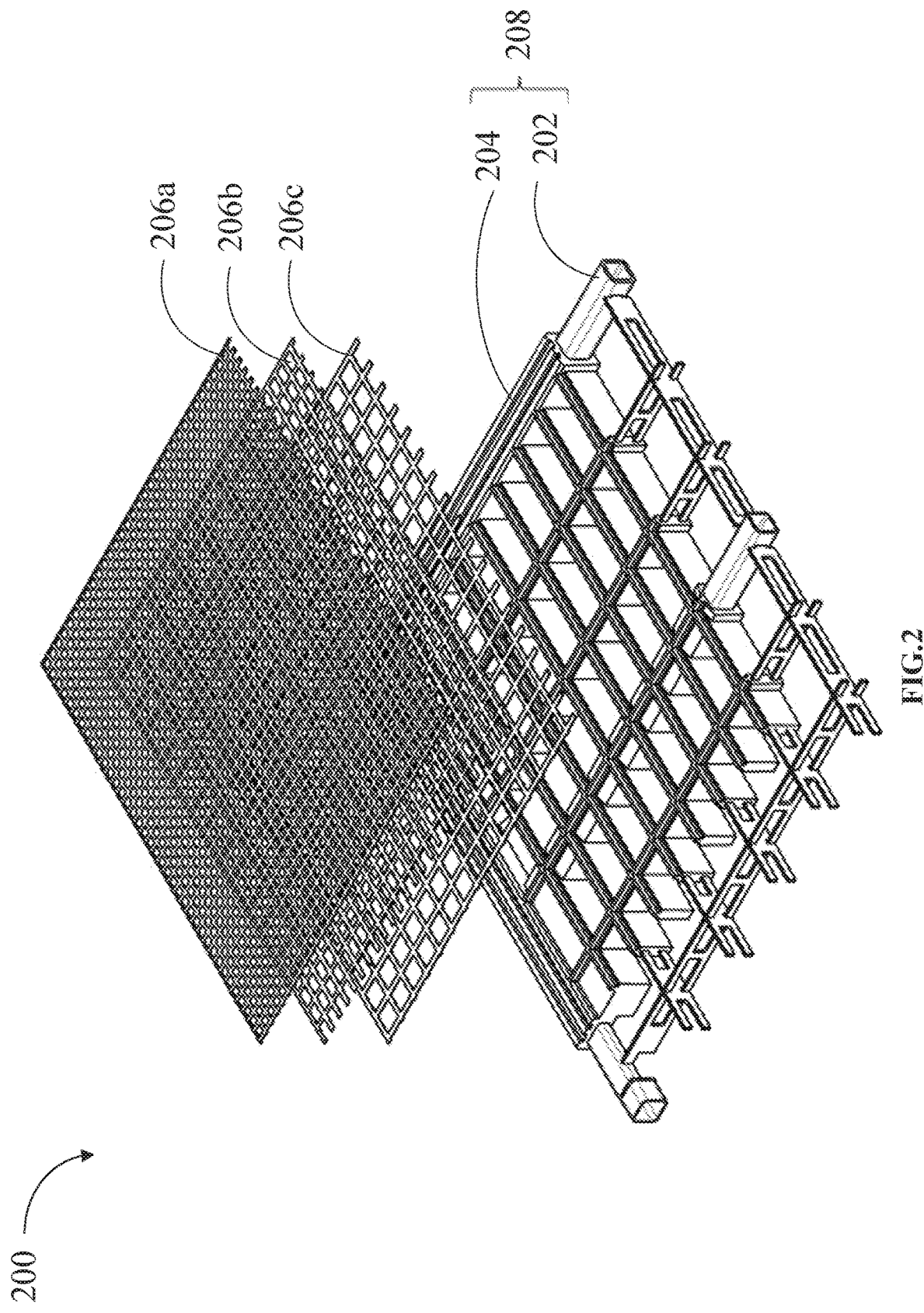
Figure 3A:
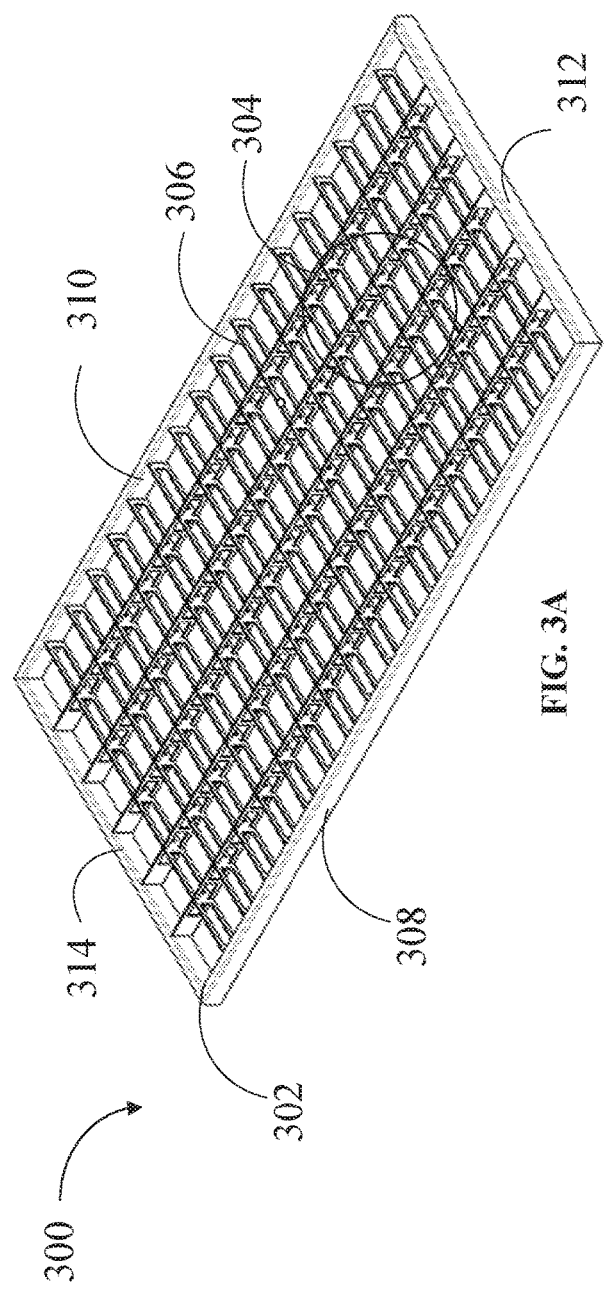
Figure 3B:
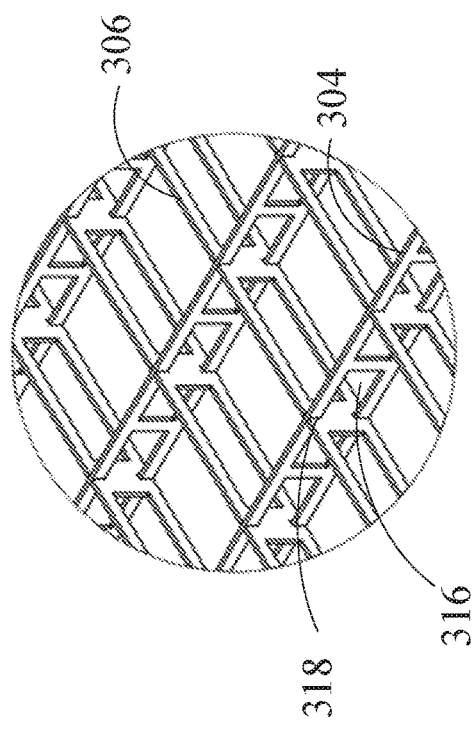
Figure 4C:
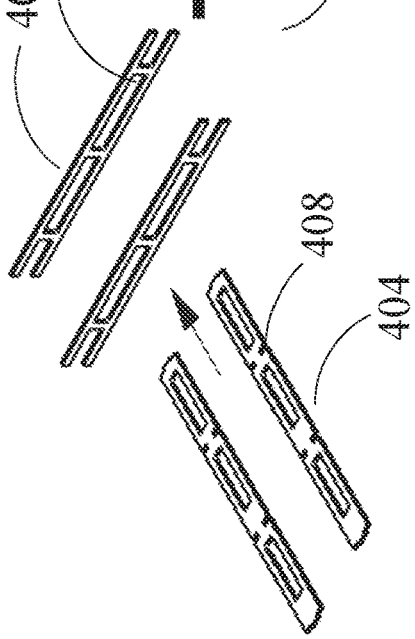
Figure 4B:
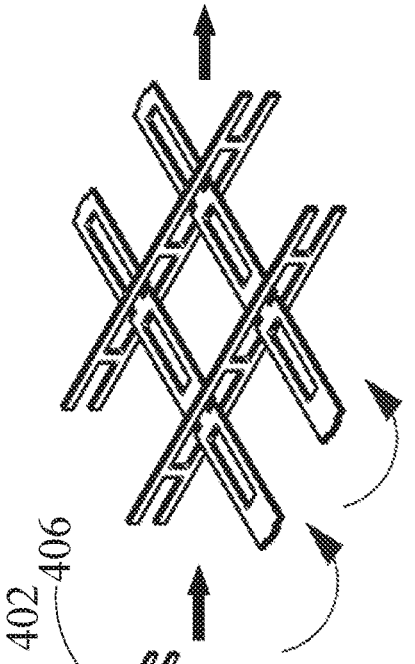
Figure 4A:
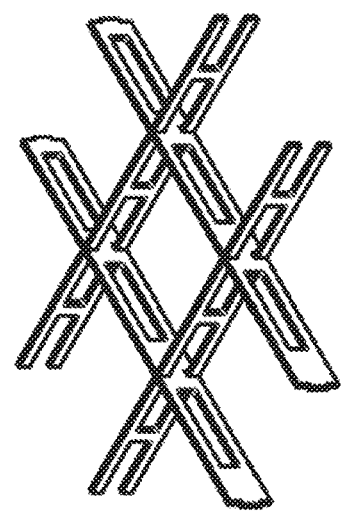
Figure 7D:
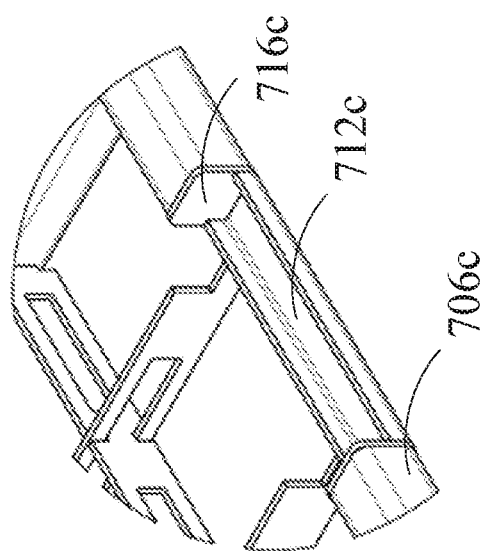
Figure 7C:
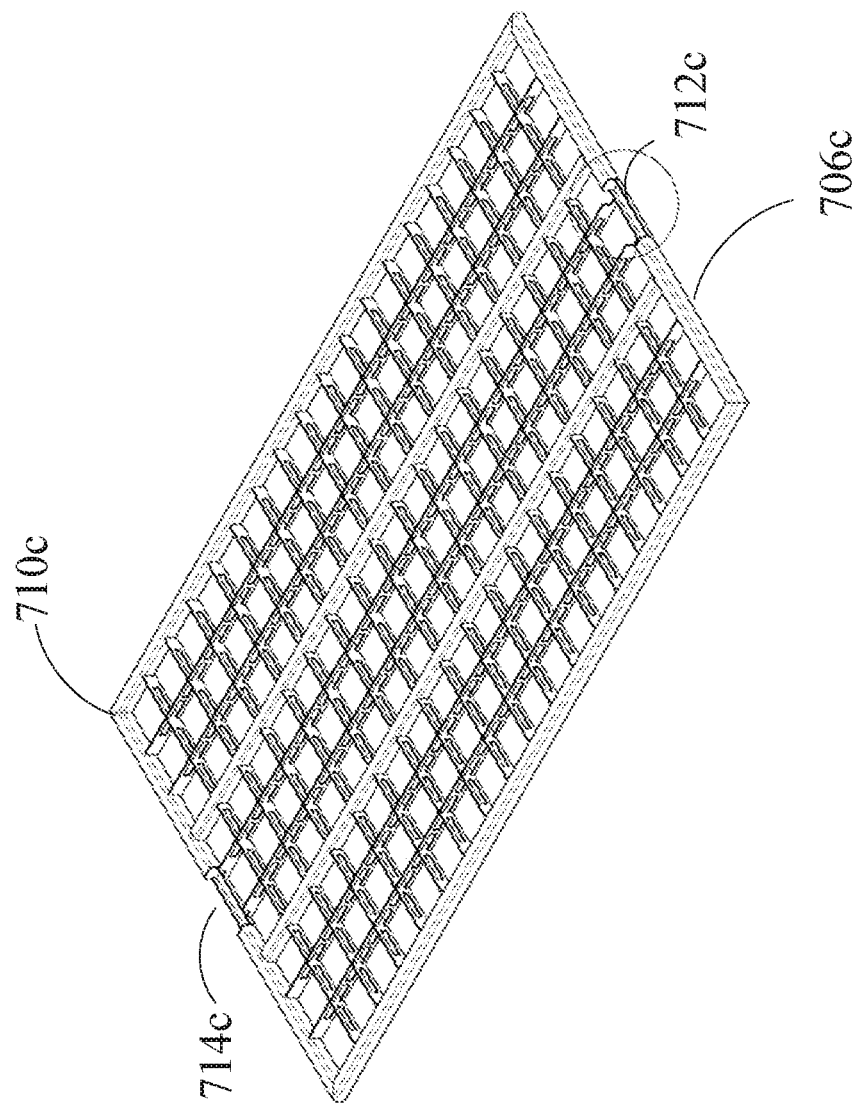
Figure 9:
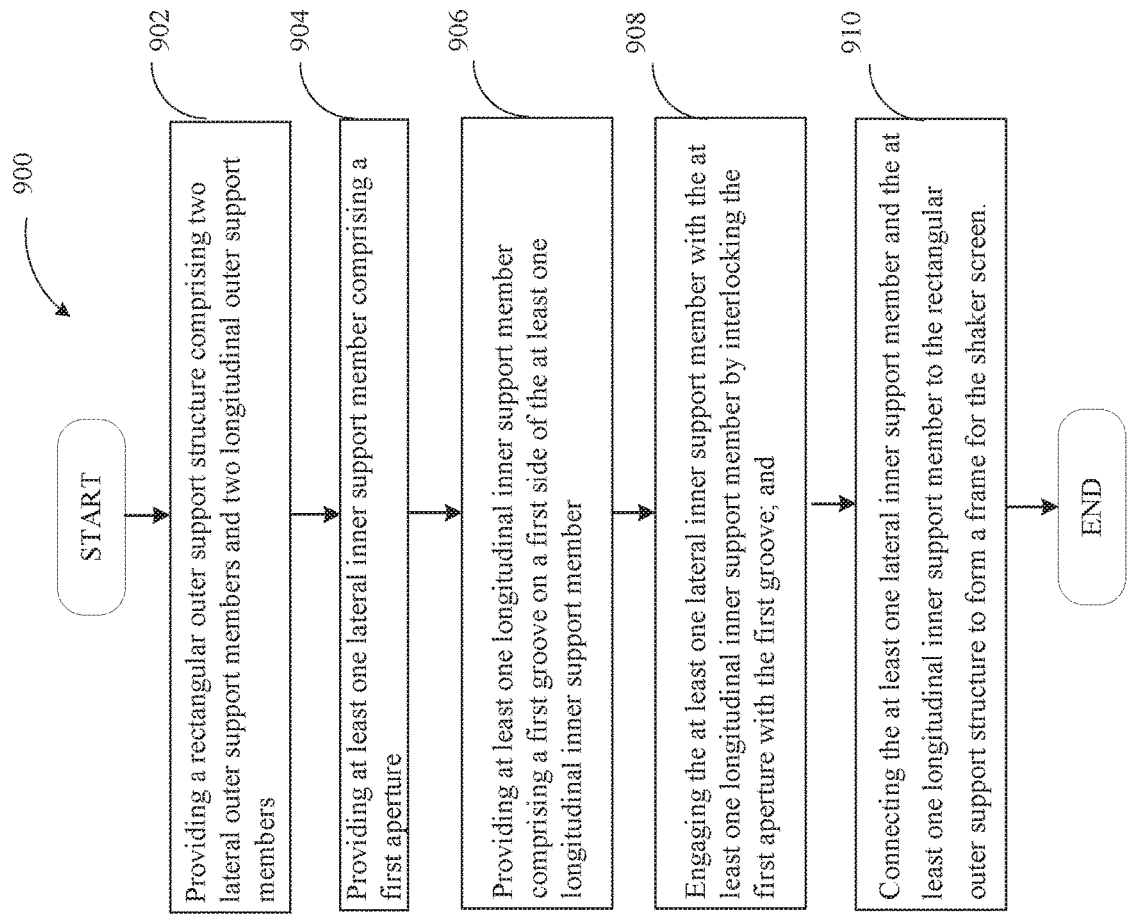

Having thus described exemplary embodiments of the disclosure in general terms, reference will now be made to the accompanying figures, which are not necessarily drawn to scale, and wherein:

FIGS. 1A, 1B, and 1C illustrate a system including a shale shaker and a shaker screen removably mounted to the shale shaker, according to an exemplary embodiment of the present disclosure;

FIG. 2 illustrates an exploded diagram of a shaker screen, according to an exemplary embodiment of the present disclosure;

FIGS. 3A and 3B illustrate a frame for a shaker screen, according to an exemplary embodiment of the present disclosure;

FIGS. 4A, 4B, and 4C illustrate a process of engaging lateral inner support members and longitudinal inner support members of a frame, according to an exemplary embodiment of the present disclosure;

FIGS. 5A, 5B, 5C, and 5D each illustrates a lateral inner support member and a longitudinal inner support member, according to an exemplary embodiment of the present disclosure;

FIGS. 6A and 6B illustrate a frame with rectangular outer support structure comprising slats, according to an exemplary embodiment of the present disclosure;

FIGS. 6C and 6D illustrate a frame with rectangular outer support structure comprising bent slats, according to an exemplary embodiment of the present disclosure;

FIGS. 7A and 7B illustrate a frame comprising an L-shaped notch on the rectangular outer support structure, according to an exemplary embodiment of the present disclosure;

FIGS. 7C and 7D illustrate a frame comprising a C-shaped notch on the rectangular outer support structure, according to an exemplary embodiment of the present disclosure;

FIGS. 7E and 7F illustrate a frame comprising a notch on the rectangular outer support structure, according to an exemplary embodiment of the present disclosure;

FIGS. 8A and 8B illustrate a connection between two shaker screens, according to an exemplary embodiment of the present disclosure; and FIG. 9 illustrates a flowchart describing a method of forming a shaker screen, according to an exemplary embodiment of the present disclosure.

DETAILED DESCRIPTION

Some embodiments of the present disclosure will now be described more fully hereinafter with reference to the accompanying figures, in which some, but not all embodiments of the disclosure are shown. Indeed, various embodiments of the disclosure may be embodied in many different forms and should not be construed as limited to the embodiments set forth herein; rather, these exemplary embodiments are provided so that this disclosure will be thorough and complete, and will fully convey the scope of the disclosure to those skilled in the art. For example, unless otherwise indicated, reference to something as being a first, a second, or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Exemplary embodiments of the present disclosure relate generally to shaker screens for shale shakers, and more particularly to shaker screens having a frame with reinforced rigidity and reduced weight. The shaker screens can be used to separate solids from drilling mud slurry. It should be understood that the methods, apparatus, and systems described herein are applicable to any of mixtures of liquids and solids, or the like.

FIG. 1A illustrates a system 100 including a shale shaker 102 and one or more shaker screens 104 (e.g., 104a, 104b, 104c) removably mounted to shale shaker 102, according to exemplary embodiments of the present disclosure. As shown, in some embodiments, shale shaker 102 may include a base 106, a vibratable screen mounting apparatus or basket 108, multiple springs 110, a motor 112, an electric control board 114, and a well logging tank 116. Base 106 may support basket 108 through multiple springs 110 (e.g., two springs 110a, 110b located on the left side shown in FIG. 1A). Springs 110 connecting base 106 and basket 108 can reduce vibration of base 106 while basket 108 is vibrating. In embodiments, motor 112 can vibrate basket 108 under the control of electric control board 114. In some embodiments, shale shaker 102 may further include well logging tank 116, which may release the drilling mud slurry smoothly. In system 100, shaker screens 104 may be removably mounted on basket 108 of shale shaker 102, as explained with reference to FIGS. 1B-1C below. Shaker screens 104 can be used to filter the solid from drilling mud slurry released from well logging tank 116. In some embodiments, system 100 may include one or more additional or alternative subparts than those shown in FIG. 1A.

As shown in FIG. 1A, in some embodiments, shaker screens 104a, 104b, 104c can be positioned or aligned side by side in a horizontal arrangement. When shaker screens 104 vibrate with basket 108, solids in the drilling mud slurry can be thrown at a certain angle diagonally upward (e.g., 45°), in a direction from shaker screens 104a to 104c. In other embodiments, shaker screens may be stacked vertically, forming several layers fully or partially overlapping with each other.

FIGS. 1B-1C illustrate an exemplary way that a shaker screen, e.g., shaker screen 104a, is mounted on basket 108 of shale shaker 102, according to exemplary embodiments of the present disclosure. In some embodiments, securing shaker screen 104a to basket 108 may involve the use of a wedge block clamp 118 and a wedge block 120. In some embodiments, wedge block clamp 118 may be an integral part of basket 108.

In some embodiments, as shown in FIG. 1B, basket 108 may also include a bump 124, and shaker screen 104a may include an exposed notch 122 on the edge of shaker screen 104a. Bump 124 may be fitted to exposed notch 122, providing the advantage of further fixing shaker screen 104a and reducing the undesirable relative movement between shaker screen 104a and shale shaker 102, when wedge block clamp 118 is loosening during the vibration of basket 108. In other embodiments, securing shaker screen 104a to basket 108 may use other methods to connect and fix the relative position of two separate parts, including sticking, interlocking, clamping, pinching, hooking, etc.

FIG. 1C illustrates shaker screen 104a mounted on basket 108, according to exemplary embodiments of the present disclosure. In some embodiments, shaker screen 104a can be placed in position underneath wedge block clamp 118 with bump 124 fitting to exposed notch 122. Wedge block 120 can then be pounded into position to secure shaker screen 104a to basket 108. Shaker screen 104a may be any suitable shaker screens or the shaker screens according to the present disclosure. Shaker screens 104b and 104c shown in FIG. 1A may be mounted on basket 108 of shale shaker 102 similarly.

FIG. 2 illustrates an exploded diagram of a shaker screen 200, according to example embodiments of the present disclosure. In some embodiments, shaker screen 200 may correspond to shaker screen 104a, 104b, and/or 104c described in FIGS. 1A-1C above. As shown, in some embodiments, shaker screen 200 may comprise a frame 202, which is encapsulated with a plastic shell 204 to form an encapsulated frame 208. Shaker screen 200 also includes at least one screen layer 206 (e.g., 206a, 206b, 206c) supported by frame 202 for sieving materials. In some embodiments, screen layers 206 may be fitted over encapsulated frame 208 for separating solids from drilling mud slurry. In some embodiments, screen layers 206 may be made up of woven wire mesh.

FIG. 3A illustrates a frame 300 for a shaker screen, according to exemplary embodiments of the present disclosure. In some embodiments, frame 300 may correspond to frame 202 described in FIG. 2 above. As shown, in some embodiments, frame 300 includes a rectangular outer support structure 302, at least one lateral inner support member 304, and at least one longitudinal inner support member 306.

As shown in FIG. 3A, in some embodiments, rectangular outer support structure 302 includes two lateral outer support members 308, 310, and two longitudinal outer support members 312, 314. In some embodiments, lateral outer support members 308, 310, and longitudinal outer support members 312, 314 may be made up of metal tubes with a cross-section in any shape (e.g., square, rectangle, round, etc.). In some embodiments, lateral outer support members 308, 310, and longitudinal outer support members 312, 314 may be hollow with two ends sealed with metal sheets. In some other embodiments, one or more of lateral outer support members 308, 310, or longitudinal outer support members 312, 314 may be made up of slats, which may be further described in FIGS. 6A-6B.

FIG. 3B illustrates a zoom-in diagram of the circled part in FIG. 3A. As shown in FIG. 3B, in some embodiments, lateral inner support member 304 includes a first aperture 316. Lateral inner support member 304 is coupled to the two longitudinal outer support members 312, 314 of rectangular outer support structure 302. In some embodiments, longitudinal inner support member 306 includes a first groove 318 on a first side (e.g., the upper side) of at least one longitudinal inner support member 306. And longitudinal inner support member 306 is connected to two lateral outer support members 308, 310. As also shown in FIG. 3B, first aperture 316 is engaged with first groove 318, such that lateral inner support member 304 is engaged with longitudinal inner support member 306. In some embodiments, first aperture 316 is engaged with first groove 318, with first aperture 316 being interlocked with first groove 318. Interlocking lateral inner support member 304 with longitudinal inner support member 306 can reinforce the structure and increase the rigidity of frame 300.

In some embodiments, as further explained with reference to FIGS. 5C-5D below, lateral inner support member 304 may include additional apertures to further reduce the weight of lateral inner support member 304. Longitudinal inner support member 306 may also include additional apertures to reduce the weight of longitudinal inner support member 306. In some embodiments, as further explained with reference to FIGS. 6A-6D below, first aperture 316 may also be used to engage with two longitudinal outer support members 312, 314. Grooves 318 may also be used to engage with two lateral outer support members 308, 310.

FIGS. 4A-4C illustrate an exemplary way that a lateral inner support member 402 is engaged with a longitudinal inner support member 404, according to exemplary embodiments of the present disclosure. In some embodiments, lateral inner support member 402 may correspond to lateral inner support member 304, and longitudinal inner support member 404 may correspond to longitudinal inner support member 306 described in FIGS. 3A-3B above. In some embodiments, as shown in FIGS. 4A-4B, longitudinal inner support member 404 may be inserted into an aperture 406 of lateral inner support member 402, making a groove 408 align with aperture 406. As shown in FIGS. 4B-4C, longitudinal inner support member 404 may then turn a certain angle (e.g., 90°) to be engaged with lateral inner support member 402, with aperture 406 being interlocked with groove 408.

FIGS. 5A-5D each illustrates an exemplary lateral inner support member and an exemplary longitudinal inner support member, according to exemplary embodiments of the present disclosure. In some embodiments, as shown in FIG. 5A, a lateral inner support member 502a includes an aperture 506a to allow engagement with a longitudinal inner support member 504a. Aperture 506a may correspond to first aperture 316 as shown in FIGS. 3A-3B. Longitudinal inner support member 504a includes a groove 508a on a first side (e.g., upper side) of longitudinal inner support member 504a. Groove 508a may correspond to first groove 318 as shown in FIGS. 3A-3B.

In some embodiments, as shown in FIG. 5B, a longitudinal inner support member 504b further comprises a second groove 510b on a second side (e.g., the bottom side) of longitudinal inner support member 504b, which is parallel to a first side (e.g. the upper side) of longitudinal inner support member 504b. An aperture 506b is engaged with a groove 508b on the first side and second groove 510b on the second side. In some embodiments, aperture 506b may correspond to first aperture 316 as shown in FIGS. 3A-3B. Groove 508b may correspond to the first groove 318 as shown in FIGS. 3A-3B.

In some embodiments, as shown in FIGS. 5C-5D, a lateral inner support member 502c may comprise one or more second apertures 512c, configured to reduce the weight of lateral inner support member 502c. A longitudinal inner support member 504d may further comprise one or more third apertures 514d, configured to reduce the weight of longitudinal inner support member 504d.

FIGS. 6A-6B illustrate an exemplary frame with a rectangular outer support structure comprising slats, according to exemplary embodiments of the present disclosure. FIG. 6B illustrates a zoom-in diagram of the circled part in FIG. 6A. A rectangular outer support structure 602a of a frame 600a includes two lateral outer support members 604a, 606a, and two longitudinal outer support members 608a, 610a. In some embodiments, at least one of two lateral outer support members 604a, 606a, or at least one of two longitudinal outer support members 608a, 610a comprises one or more slats. For example, as shown in FIGS. 6A-6B, lateral outer support member 604a may include a slat 612a, and longitudinal outer support member 608a may include a couple of slats 614a, 616a.

In some embodiments, as shown in FIGS. 6C-6D, at least one of the slats (e.g., the slats forming a lateral outer support member 604c) comprises a bent slat 612c, configured to enhance strength of the rectangular outer support structure. In other embodiments, two longitudinal outer support members 608c, 610c may also be formed with bent slats.

FIGS. 7A-7F illustrate exemplary frames comprising exposed notches on rectangular outer support structures, according to exemplary embodiments of the present disclosure. In some embodiments, at least one of the two lateral outer support members or at least one of the two longitudinal outer support members of a rectangular outer support structure comprises an exposed notch configured to connect to a device (e.g., a shale shaker) or another shaker screen.

In some embodiments, as shown in FIGS. 7A-7B, a rectangular outer support structure 710a may comprise a couple of L-shaped notches 712a, 714a. FIG. 7B illustrates a zoom-in diagram of the circled part in FIG. 7A. L-shaped notch 712a may be formed on a longitudinal outer support member 706a made up of a rectangular tube. As shown in FIG. 7B, two ends of L-shaped notch 712a may be sealed with metal sheets 716a (the other metal sheet is not shown).

In some embodiments, as shown in FIGS. 7C-7D, a rectangular outer support structure 710c may comprise a couple of C-shaped notches 712c, 714c. FIG. 7D illustrates a zoom-in diagram of the circled part in FIG. 7C. C-shaped notch 712c may be formed on a longitudinal outer support member 706c made up of a rectangular tube. As shown in FIG. 7D, two ends of C-shaped notch 712c are sealed with metal sheets 716c (the other metal sheet is not shown).

In other embodiments, as shown in FIGS. 7E-7F, a rectangular outer support structure 710e may comprise multiple notches 712e. Notches 712e may be formed on a lateral outer support members 702e made up of a bent slat.

In other embodiments, a rectangular outer support structure may comprise means for securing a device (e.g., a shale shaker) or another shaker screen, such as notches, interlocked junctions, sticking structures, clamping structures, pinching structures, hooking structures, etc.

FIGS. 8A-8B illustrate an exemplary connection between two exemplary shaker screens, according to exemplary embodiments of the present disclosure. In some embodiments, a first shaker screen 802 and a second shaker screen 804 each may comprise notches 806, 808, and hooks 810, 812 on opposing sides of the shaker screens 802, 804. First shaker screen 802 may be coupled to second shaker screen 804 by securing hooks 812 on second shaker screen 804 to notches 806 on first shaker screen 802.

FIG. 9 is a flowchart illustrating a method 900 of forming a frame 300 for a shaker screen, according to exemplary embodiments of the present disclosure. In some embodiments, at block 902, method 900 includes providing a rectangular outer support structure 302 comprising two lateral outer support members 308, 310, and two longitudinal outer support members 312, 314. At block 904, method 900 includes providing at least one lateral inner support member 304 comprising a first aperture 316. At block 906, method 900 includes providing at least one longitudinal inner support member 306 comprising a first groove 318 on a first side (e.g., the upper side) of at least one longitudinal inner support member 306. At block 908, method 900 includes engaging at least one lateral inner support member 304 with at least one longitudinal inner support member 306 by interlocking first aperture 316 with first groove 318. At block 910, method 900 includes connecting at least one lateral inner support member 304 and at least one longitudinal inner support member 306 to rectangular outer support structure 302 to form frame 300 for the shaker screen.

In some embodiments, at block 902, a part of rectangular outer support structure 302 may be formed first. For example, connecting two lateral outer support members 308, 310 and one longitudinal outer support member 312 (or 314) to form a C-shaped part of rectangular outer support structure 302 at the first place. The rest part of rectangular outer support structure 302 (e.g., longitudinal outer support member 314 (or 312)) can be completed after the step at block 908 or 910.

Many modifications and other embodiments of the disclosure set forth herein will come to mind to one skilled in the art to which the disclosure pertains having the benefit of the teachings presented in the foregoing description and the associated figures. Therefore, it is to be understood that the disclosure is not to be limited to the specific embodiments disclosed and that modifications and other embodiments are intended to be included within the scope of the appended claims. Moreover, although the foregoing description and the associated figures describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A frame for a shaker screen, comprising:
a rectangular outer support structure, comprising two lateral outer support members and two longitudinal outer support members;
at least one lateral inner support member, comprising a first aperture and coupled to the two longitudinal outer support members; and
at least one longitudinal inner support member coupled to the two lateral outer support members,
wherein the at least one longitudinal inner support member comprises a first groove on a first side of the at least one longitudinal inner support member and a second groove on a second side of the at least one longitudinal inner support member, wherein the second side is parallel to the first side,
wherein the first aperture is engaged with the first groove and the second groove, such that the at least one lateral inner support member is engaged with the at least one longitudinal inner support member.

2. The frame of claim 1, wherein:
the at least one lateral inner support member comprises one or more second apertures configured to reduce a weight of the at least one lateral inner support member; or
the at least one longitudinal inner support member comprises one or more third apertures configured to reduce a weight of the at least one longitudinal inner support member.

3. The frame of claim 1, wherein the first aperture is engaged with the first groove, with the first aperture being interlocked to the first groove.

4. The frame of claim 1, wherein at least one of the two lateral outer support members or the two longitudinal outer support members comprises one or more slats.

5. The frame of claim 4, wherein at least one of the one or more slats comprises a bent slat configured to enhance strength of the rectangular outer support structure.

6. The frame of claim 1, wherein at least one of the two lateral outer support members or the two longitudinal outer support members comprises an exposed notch configured to connect to a device or another shaker screen.

7. A shaker screen, comprising:
a frame for the shaker screen, comprising:
a rectangular outer support structure, comprising two lateral outer support members and two longitudinal outer support members;
at least one lateral inner support member, comprising a first aperture and coupled to the two longitudinal outer support members; and
at least one longitudinal inner support member coupled to the two lateral outer support members,
wherein the at least one longitudinal inner support member comprises a first groove on a first side of the at least one longitudinal inner support member and a second groove on a second side of the at least one longitudinal inner support member, wherein the second side is parallel to the first side,
wherein the first aperture is engaged with the first groove and the second groove, such that the at least one lateral inner support member is engaged with the at least one longitudinal inner support member; and
at least one screen layer supported by the frame for sieving materials.

8. The shaker screen of claim 7, wherein:
the at least one lateral inner support member comprises one or more second apertures configured to reduce a weight of the at least one lateral inner support member; or
the at least one longitudinal inner support member comprises one or more third apertures configured to reduce a weight of the at least one longitudinal inner support member.

9. The shaker screen of claim 7, wherein at least one of the two lateral outer support members or the two longitudinal outer support members comprises one or more slats.

10. The shaker screen of claim 9, wherein at least one of the one or more slats comprises a bent slat configured to enhance strength of the rectangular outer support structure.

11. The shaker screen of claim 7, wherein the rectangular outer support structure comprises means for securing the shaker screen on a device or another shaker screen.

12. A method of forming a frame for a shaker screen comprising:
- providing a rectangular outer support structure comprising two lateral outer support members and two longitudinal outer support members;
- providing at least one lateral inner support member comprising a first aperture and coupled to the two longitudinal outer support members;
- providing at least one longitudinal inner support member comprising a first groove on a first side of the at least one longitudinal inner support member and a second groove on a second side of the at least one longitudinal inner support member, wherein the second side is parallel to the first side, wherein the at least one longitudinal inner support member is coupled to the two lateral outer support members;
- engaging the at least one lateral inner support member with the at least one longitudinal inner support member by interlocking the first aperture with the first groove and the second groove; and
- connecting the at least one lateral inner support member and the at least one longitudinal inner support member to the rectangular outer support structure to form a frame for the shaker screen.

13. A system, comprising:
- a shale shaker; and
- a shaker screen removably mounted to the shale shaker, wherein the shaker screen includes:
  - a frame comprising:
    - a rectangular outer support structure, comprising two lateral outer support members and two longitudinal outer support members;
    - at least one lateral inner support member, comprising a first aperture and coupled to the two longitudinal outer support members; and
    - at least one longitudinal inner support member coupled to the two lateral outer support members,
    - wherein the at least one longitudinal inner support member comprises a first groove on a first side of the at least one longitudinal inner support member and a second groove on a second side of the at least one longitudinal inner support member, wherein the second side is parallel to the first side,
    - wherein the first aperture is engaged with the first groove and the second groove, such that the at least one lateral inner support member is engaged with the at least one longitudinal inner support member; and
  - at least one screen layer supported by the frame for sieving materials.

14. The system of claim 13, wherein:
- the at least one lateral inner support member comprises one or more second apertures configured to reduce a weight of the at least one lateral inner support member; or
- the at least one longitudinal inner support member comprises one or more third apertures configured to reduce a weight of the at least one longitudinal inner support member.

15. The system of claim 13, wherein at least one of the two lateral outer support members or the two longitudinal outer support members comprises one or more slats.

16. The system of claim 15, wherein at least one of the one or more slats comprises a bent slat configured to enhance strength of the rectangular outer support structure.

17. The system of claim 13, wherein at least one of the two lateral outer support members or the two longitudinal outer support members comprises an exposed notch configured to connect to the shale shaker or another shaker screen.

* * * * *